C. A. KING AND W. S. RAWSON.
CALCINING.
APPLICATION FILED SEPT. 3, 1918.
1,400,443.
Patented Dec. 13, 1921.
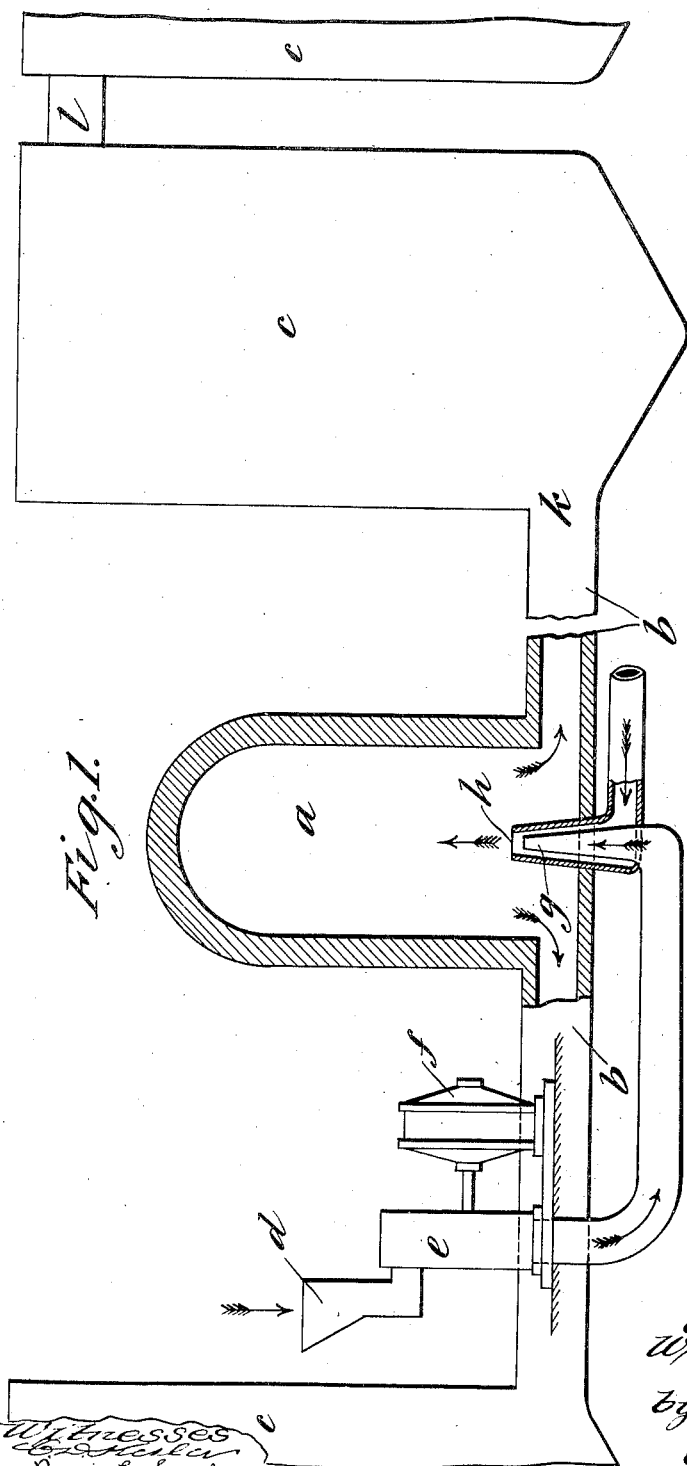
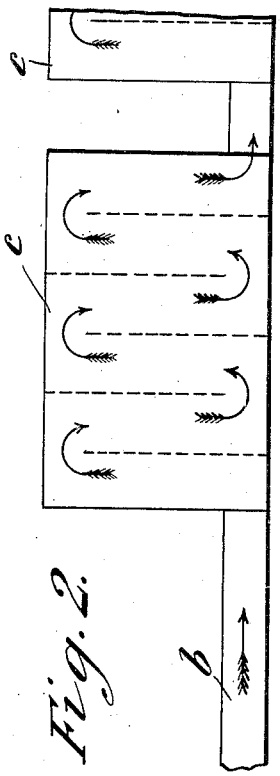

UNITED STATES PATENT OFFICE.

CHARLES ARTHUR KING, OF LEEDS, AND WILLIAM STEPNEY RAWSON, OF LONDON, ENGLAND.

CALCINING.

1,400,443.　　　　Specification of Letters Patent.　　Patented Dec. 13, 1921.

Application filed September 3, 1918. Serial No. 252,437.

*To all whom it may concern:*

Be it known that we, CHARLES ARTHUR KING and WILLIAM STEPNEY RAWSON, both subjects of the King of Great Britain, residing, respectively, in Leeds, England, and London, England, have jointly invented certain new and useful Improvements in Calcining, of which the following is a specification.

The endothermic process known as calcination depends for its completion at any given temperature on the partial pressure of the gaseous or vaporous product in the atmosphere surrounding the particles under treatment. This condition has largely determined the mode of calcination whenever the minimum temperature has been a desideratum, it having been realized that a strong draft is essential for removal of the gaseous product from the calcining chamber. The practice has been to pass the gaseous current constituting the draft over the material under treatment while the latter is stationary in, or slowly moving through the chamber. It is obvious, however, that the draft has little or no effect upon the atmosphere within lumps of the material.

The term calcination has sometimes been used to express the operation more properly described as roasting. Calcination, however, is an endothermic process involving the expulsion by heat of constituents of the body under treatment, whereas roasting is an exothermic process involving the chemical combination of a constituent of the body under treatment with some element, generally oxygen or chlorin, added in the operation.

The present invention is not concerned with roasting, which has frequently been performed by injecting the finely powdered body into a furnace in which combustion or chlorination occurs.

By the present invention calcination is effected by carrying the material through the calcining chamber by means of the gaseous current constituting the necessary draft. It is essential for this purpose that the material to be calcined should be finely subdivided, and therein lies an important advantage of the invention since it is far easier to calcine uniformly at minimum temperature a small particle than a lump. Hitherto, the calcination of fine particles has been but little easier than that of lumps, because the only mode of exposing them individually to the heating agency has consisted in rolling them over each other in apparatus of the type of a rotary tubular kiln.

This invention consists in suspending the finely subdivided material under treatment in a current of gas, commonly air, and passing the current through a suitably heated chamber into a collecting or depositing chamber or flue, whence the gaseous current issues leaving behind substantially the whole of the now calcined material. Since it is advantageous that the calcined particles shall be deposited at a temperature as high as is practicable to avoid re-combination of the constituents of the dissociated material, the said flue or chamber may contain a device for expediting the deposition, such as any known electrical apparatus suitable for the purpose.

Where it is feasible to use as the calcining chamber a sufficiently narrow passage the chamber may be externally heated, but generally speaking internal heating is preferable and to this the invention particularly lends itself since the air which is to burn the fuel in the chamber may be the gaseous current in which the material to be calcined is suspended.

The material in the form of fine powder may be injected by and in a blast of air or gaseous fuel into a vertical or suitably inclined combustion chamber closed at its upper end, so that the powder travels along an upward path and returns along a path or paths more or less close to the wall or walls of the chamber which are heated by the combustion proceeding in the chamber; this return travel of the particles close to the walls of the chamber is mainly for the purpose of prolonging the path of the particles in the heated chamber, but is also for purposes well-understood in connection with the injection of fuel into a chamber namely that it minimizes the tendency for the flame to become extinguished in that it has a regenerative effect. Since, in the majority of cases, the constituents of fuel ash should not be mixed with the calcined material ashless fuel is generally to be used.

The accompanying diagram illustrates the preferred mode of operating; Figure 1 represents in sectional elevation a suitable apparatus; Fig. 2 is a part plan of Fig. 1.

$a$ is a bell-shaped combustion chamber communicating at its lower part by means of flues $b$ with collecting chambers $c$. The material to be calcined is fed into a hopper $d$ whence it enters a pulverizer $e$ driven by a motor $f$. This pulverizer is of the type which is capable of acting also as a fan. It delivers the powdered material together with a blast of air through the nozzle $g$ into the combustion chamber $a$. Oil or gaseous fuel is at the same time injected into the chamber through nozzle $h$. By this arrangement the fuel is burnt in the form of a long flame up which the material to be calcined is traveling. The current of gases and material is deflected by the dome of the chamber and descends along paths more or less close to the walls. At the bottom of the chamber the current divides itself between flues $b$ and carries the material through these flues into the collecting chambers $c$. Here, as indicated in Fig. 2, are baffles $i$ extending from top to bottom of the chamber so as to cause a zig-zag path in the horizontal direction for the gases from the inlet $k$ to the outlet $l$ of the chamber. As here shown, there are two collecting chambers in series on each side of the combustion chamber the passage of the gases being upward in the first and downward in the second.

Having thus fully described our invention and the best means we know for carrying the same into practical effect, we claim:—

1. A process of endothermic calcination of pulverulent material which consists in causing a gaseous current to take up the material and carry it in suspension upwardly within a combustion chamber and then downwardly therein, and separating the calcined material from the gaseous current at a high temperature.

2. A process of endothermic calcination of pulverulent material which consists in directing the material upwardly by means of a current of air through a flame within a combustion chamber and then downwardly between the flame and the chamber wall, and separating the calcined material from the gaseous current.

3. A process of endothermic calcination of pulverulent material which consists in causing the material to be borne upward within a combustion chamber by a current of air through a flame produced by the said current of air and an enveloping stream of combustible and carrying the material downward by the gaseous current between the flame and the wall of the combustion chamber, and then separating the calcined material from the gaseous current at a high temperature.

In testimony whereof we have signed our names to this specification.

CHARLES ARTHUR KING.
WILLIAM STEPNEY RAWSON.